United States Patent [19]

Osenbaugh

[11] Patent Number: 5,271,294
[45] Date of Patent: Dec. 21, 1993

[54] BANJO TYPE AXLE HOUSING HAVING DIFFERENTIAL CARRIER SUPPORT STRUCTURE

[75] Inventor: Carl D. Osenbaugh, Taipei, Taiwan
[73] Assignee: Dana Corporation, Toledo, Ohio
[21] Appl. No.: 880,753
[22] Filed: May 8, 1992
[51] Int. Cl.⁵ .......................................... F16H 57/02
[52] U.S. Cl. .................... 74/607; 74/606 R
[58] Field of Search ............... 74/606 R, 607, 606 A; 29/462, 463; 180/378, 379

[56] References Cited

U.S. PATENT DOCUMENTS

| | | | |
|---|---|---|---|
| 916,888 | 3/1909 | Renault | 74/607 |
| 1,534,605 | 4/1925 | Murray, Jr. | 74/606 R |
| 1,903,146 | 3/1933 | Sterling | 74/607 |
| 2,015,969 | 10/1935 | Schildknecht | 74/607 |
| 2,153,287 | 4/1939 | Wallace et al. | 74/606 R |
| 2,204,287 | 6/1940 | Wilber | 74/606 R |
| 2,480,833 | 9/1949 | Buckendale | 74/607 |
| 2,674,783 | 4/1954 | Schneider et al. | 74/606 R |
| 2,735,315 | 2/1956 | Zenker | 74/607 |
| 3,238,812 | 3/1966 | Hedstrom | 74/607 |
| 3,269,214 | 8/1966 | Nagel | 74/606 R |
| 3,412,631 | 11/1968 | Frost | 74/607 X |
| 4,068,541 | 1/1978 | Sakamoto et al. | 74/606 R X |
| 4,221,138 | 9/1980 | Stewart et al. | 74/607 |
| 4,760,755 | 8/1988 | Peck | 74/606 R |
| 4,815,338 | 3/1989 | Holan et al. | 74/607 X |
| 4,841,802 | 6/1989 | Peck | 74/606 R |

FOREIGN PATENT DOCUMENTS 691216  4/1940  Fed. Rep. of Germany ........ 74/607

*Primary Examiner*—Vinh T. Luong
*Attorney, Agent, or Firm*—MacMillan, Sobanski & Todd

[57] ABSTRACT

A structure for mounting a differential carrier having a plurality of bearing supports on a banjo type axle housing is provided for minimizing the amount of deflection of such bearing supports during use. The axle housing has a rim plate attached thereto including an opening which receives the carrier and the differential. A plurality of tabs are formed about the circumference of the rim plate, each extending within the axle housing. When the carrier is assembled to the rim plate and the axle housing, the bearing supports thereof are inserted within the opening formed through the rim plate. As the carrier is inserted, the bearing supports formed thereon are guided by the tabs formed on the rim plate. When the carrier is secured to the rim plate and the axle housing, the rim plate tabs engage and support the bearing supports. As a result, torque loads generated by operation of the differential are transferred to the axle housing, and deflection of the bearing supports is minimized.

20 Claims, 3 Drawing Sheets

BANJO TYPE AXLE HOUSING HAVING DIFFERENTIAL CARRIER SUPPORT STRUCTURE

BACKGROUND OF THE INVENTION

This invention relates in general to vehicle axle assemblies and in particular to an improved structure for mounting a differential carrier on a banjo type axle housing.

Axle assemblies are well known structures which are in common use in most vehicles. Such axle assemblies include a number of components which are adapted to transmit rotational power from an engine of the vehicle to the wheels thereof. Typically, an axle assembly includes a differential which is rotatably supported within a non-rotating carrier. The differential is connected between an input drive shaft extending from the vehicle engine and a pair of output axle shafts extending to the vehicle wheels. The axle shafts are contained in respective non-rotating tubes which are secured to the carrier. Thus, rotation of the differential by the drive shaft causes corresponding rotation of the axle shafts. The carrier and the tubes form a housing for these drive train components of the axle assembly, inasmuch as the differential and the axle shafts are supported for rotation therein.

Axle housings are generally classified into two basic types. The first axle housing type is a unitized carrier construction, commonly referred to as a Salisbury or Spicer type axle assembly. In this structure, the carrier (which houses the rotatable differential) is directly connected to the two tubes (which house the rotatable axle shafts). An opening is provided at the rear of the carrier to permit assembly of the differential therein. This opening is closed by a cover during use. Unitized carrier axle housing constructions of this type are economical to manufacture and are readily adaptable for a variety of vehicles.

The second axle housing type is a separable carrier construction. In this structure, the axle tubes are connected together by a central member which is formed separate and apart from the carrier. This central member is generally hollow and cylindrical in shape, having a large generally circular opening formed therethrough. During assembly, the differential is first assembled within the carrier, then the carrier is secured to the central member. The overall shape of this type of axle housing (i.e., the generally round shape of the central member and the elongated tubes extending therefrom) generally resembles the shape of a banjo musical instrument. Hence, this type of axle housing is commonly referred to as a banjo type axle housing. Banjo type axle housings are advantageous because the carrier and differential can be removed from the axle assembly for service without disturbing the other components thereof.

As mentioned above, the differential is supported for rotation within the carrier. In a conventional banjo type axle housing, the differential is rotatably supported by annular bearings which are mounted on bearing supports formed integrally with the carrier. These bearing supports are elongated and extend within the interior of the central member of the axle housing. Because they support the differential, the bearing supports are subjected to torque loads created when the axle assembly is operated. These torque loads can be large enough to deflect the bearing supports, causing undesirable misalignment of the differential gears and consequent premature wear. With known carrier structures, the size of the bearing supports is limited by the available space within the opening of the central member. Thus, it would be desirable to provide an improved structure for mounting the carrier on a banjo type axle housing which minimizes the deflections of the bearing supports and, therefore, extends the useful life of the axle assembly.

SUMMARY OF THE INVENTION

This invention relates to an improved structure for mounting a differential carrier having a plurality of bearing supports on a banjo type axle housing so as to minimize the amount of deflection of such bearing supports during use. The axle housing has a rim plate attached thereto including an opening which receives the carrier and the differential. A plurality of tabs are formed about the circumference of the rim plate, each extending within the axle housing. When the carrier is assembled to the rim plate and the axle housing, the bearing supports thereof are inserted within the opening formed through the rim plate. As the carrier is inserted, the bearing supports formed thereon are guided by the tabs formed on the rim plate. When the carrier is secured to the rim plate and the axle housing, the rim plate tabs engage and support the bearing supports. As a result, torque loads generated by operation of the differential are transferred to the axle housing, and deflection of the bearing supports is minimized.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
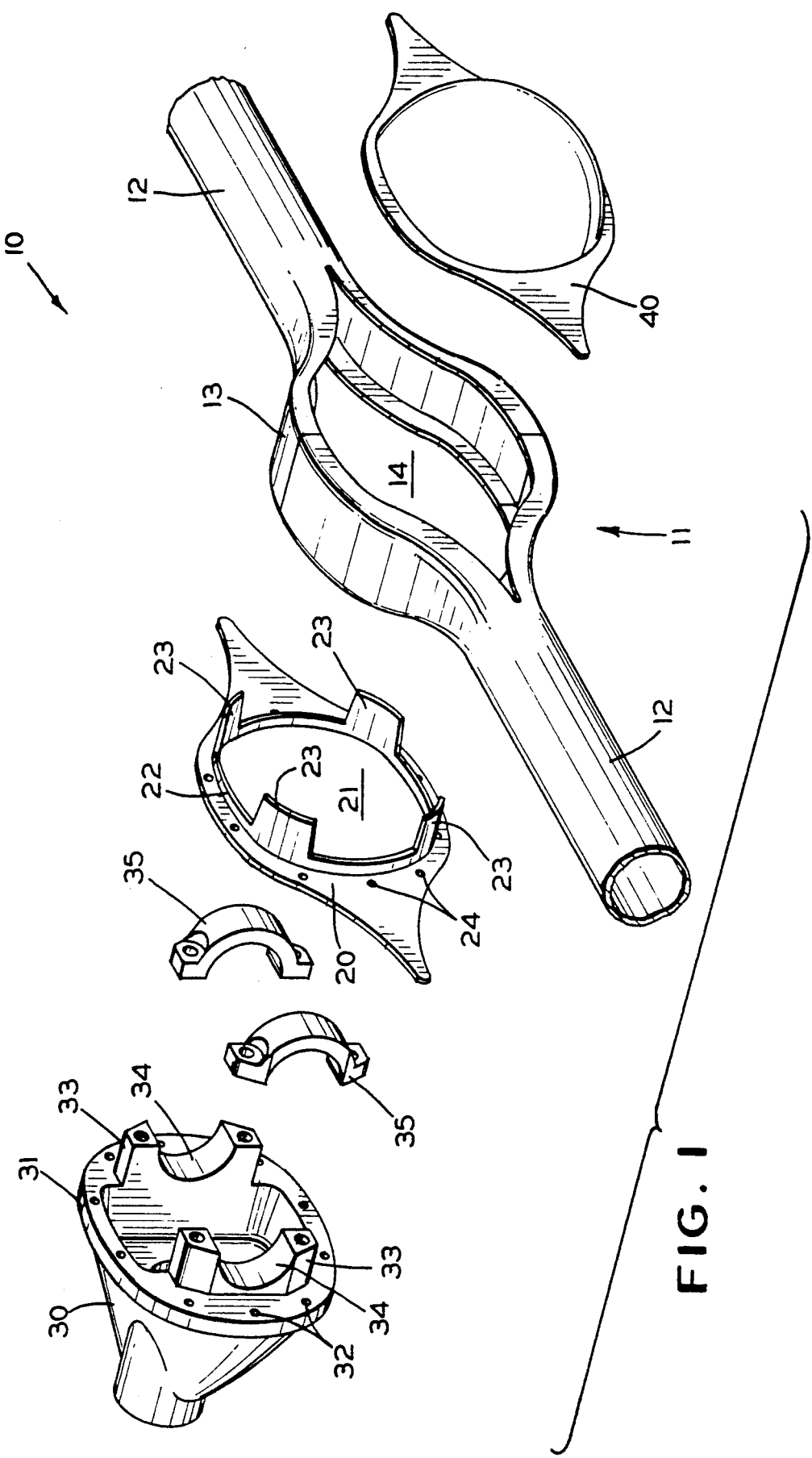
FIG. 1 is an exploded view of a first embodiment of a portion of an axle assembly in accordance with this invention.

Referring now to the drawings, there is illustrated in FIGS. 1 through 4 a portion of a first embodiment of an axle assembly, indicated generally at 10, in accordance with this invention. The axle assembly 10 includes a banjo type axle housing, indicated generally at 11, which can be formed by any conventional method. For example, the axle housing 11 can be formed from a pair of tubes 12 having upper and lower split ends which are attached together by welding to form a central portion 13 defining an opening 14 therethrough. The tubes 12 extend laterally from the central portion 13 and are adapted to enclose respective rotatable axle shafts (not shown) therein.

The axle assembly 10 further includes a rim plate 20 having an opening 21 formed therethrough. As will be explained below, the opening 21 extends generally coextensive with the opening 14 formed through the central portion 13 when the rim plate 20 is attached to the rearward side of the axle housing 11. A small forwardly extending flange 22 is formed about the opening 21 of the rim plate 20. The purpose of this flange 22 will be explained below. Additionally, a plurality of tabs 23 are formed about the opening 21 of the rim plate 20, each extending forwardly from the flange 22. Four of such tabs 23 are provided in the illustrated embodiment, although a greater or lesser may be provided The rim plate 20 may be formed having a plurality of bolt holes 24 located about the periphery of the opening 21. Alternatively, the bolt holes 24 may be drilled in the rim plate 20 after the rim plate 20 has been attached to the axle housing 11. In either event, the bolt holes 24 should be located precisely relative to the axle housing 11. The purpose of these bolt holes 24 will be explained below.

The axle assembly 10 further includes a carrier 30 which is adapted to enclose and rotatably support a conventional differential (not shown) therein. The carrier 30 includes a mounting flange 31 having a plurality of bolt holes 32 formed therethrough. As will be explained below, the mounting flange 31 and the bolt holes 32 are provided to secure the carrier 30 to the rim plate 20. To rotatably support the differential thereon, the carrier 30 is provided with a pair of forwardly extending bearing supports 33. In the illustrated embodiment, the bearing supports 33 are formed integrally with the carrier 30.

A semi-circular recess 34 is formed in the end of the each of the bearing supports 33 for receiving respective conventional annular bearings (not shown) therein. These bearings are provided for rotatably supporting the differential within the carrier 30. The bearings are retained within the recesses 34 of the bearing supports 33 by a pair of bearing caps 35. The bearing caps 35 are respectively secured to the ends of the bearing supports 33 by threaded fasteners (not shown).

Lastly, the axle assembly 10 includes a cover 40. As will be explained below, the cover 40 is attached to the forward side of the axle housing 11 by welding or similar means. The cover 40 closes the opening 14 formed in the central portion 13 of the axle housing 11 and, therefore, protects the differential and other components contained therein.

To assemble the axle assembly 10, the differential is initially mounted within the carrier 30. This is accomplished by mounting the annular bearings on the ends of the differential, then inserting the differential within the carrier 30 such that the bearings are received within the recesses 34 of the bearing supports 33. The bearing caps 35 are then secured to the bearing supports 33 to retain the bearings therein. Thus, the differential is supported for rotational movement within the carrier 30.

Next, the rim plate 20 is attached to the rearward side of the axle housing 11 by welding or other means. As discussed above, the rim plate 20 is formed having the forwardly extending flange 22 and the forwardly extending tabs 23. When the rim plate 20 is attached to the axle housing 11, the flange 22 and the tabs 23 extend through the opening 14 of the central portion 13 into the interior of the axle housing 11. The flange 22 may be utilized to position the rim plate 20 relative to the axle housing 11 before being attached thereto.

Figure 2:
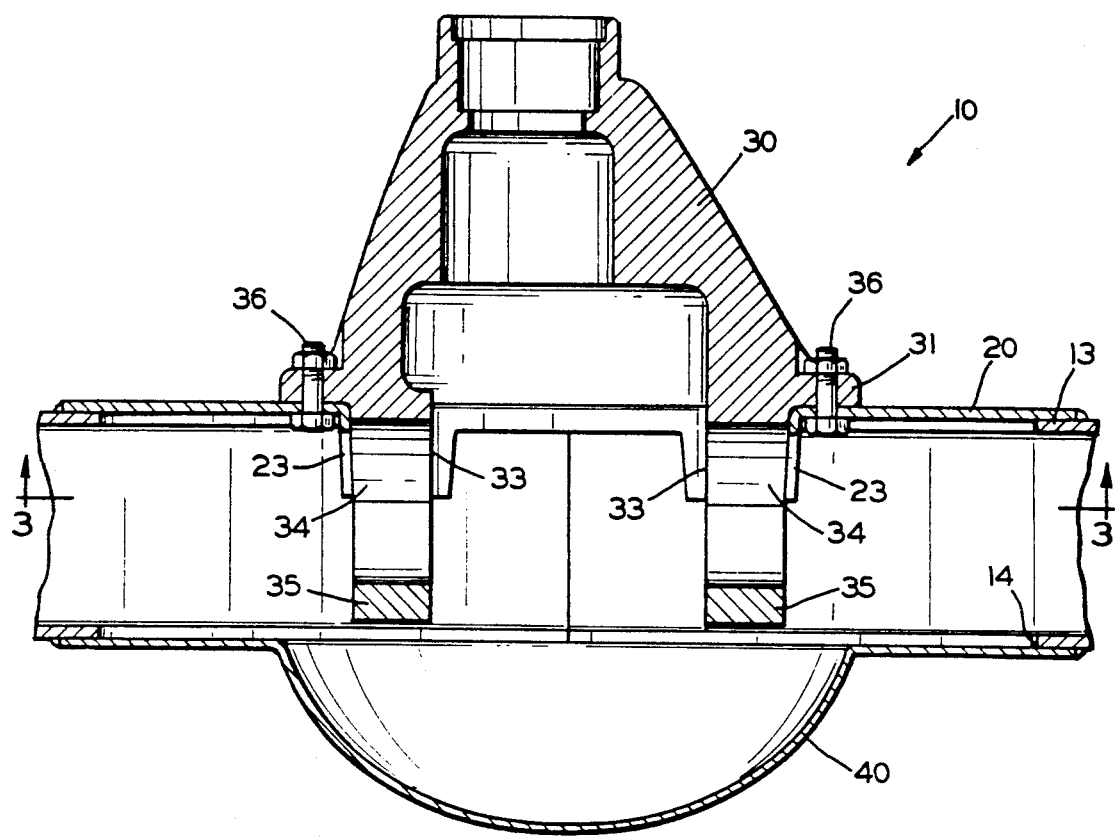
FIG. 2 is a sectional top plan view of a portion of the axle assembly shown in FIG. 1, the components thereof shown assembled.
Figure 3:
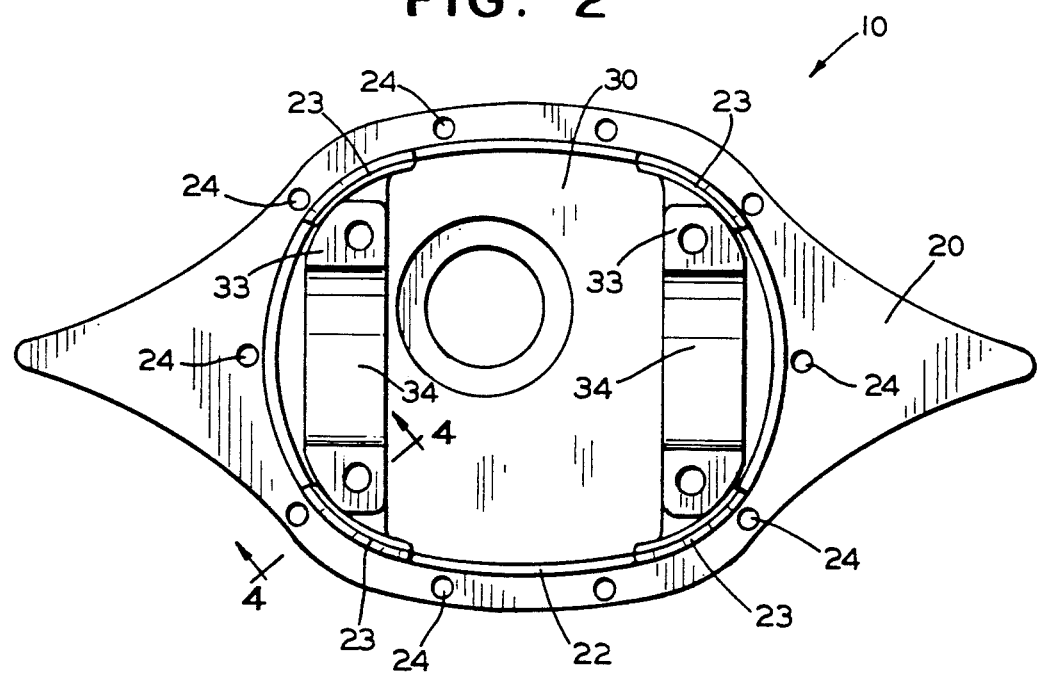
FIG. 3 is an elevational view of the rim plate and the carrier taken in the direction of line 3—3 of FIG. 2.

After the rim plate 20 has been secured to the axle housing, the carrier 30 (including the differential rotatably supported therein) is secured to the rim plate 20. This is accomplished by providing a plurality of bolts 36 (see FIG. 2) which extend through the aligned bolt holes 32 and 24 formed respectively in the carrier mounting flange 31 and the rim plate 20. As discussed above, the carrier 30 is formed having the forwardly extending bearing supports 33. When the carrier 30 is attached to the rim plate 20, the bearing supports 33 extend through the opening 21 of the rim plate 20 and through the opening 14 of the central portion 13 into the interior of the axle housing 11. The structure of the axle assembly 10 after assembly is illustrated in FIGS. 2, 3, and 4.

Figures 4, 4A:
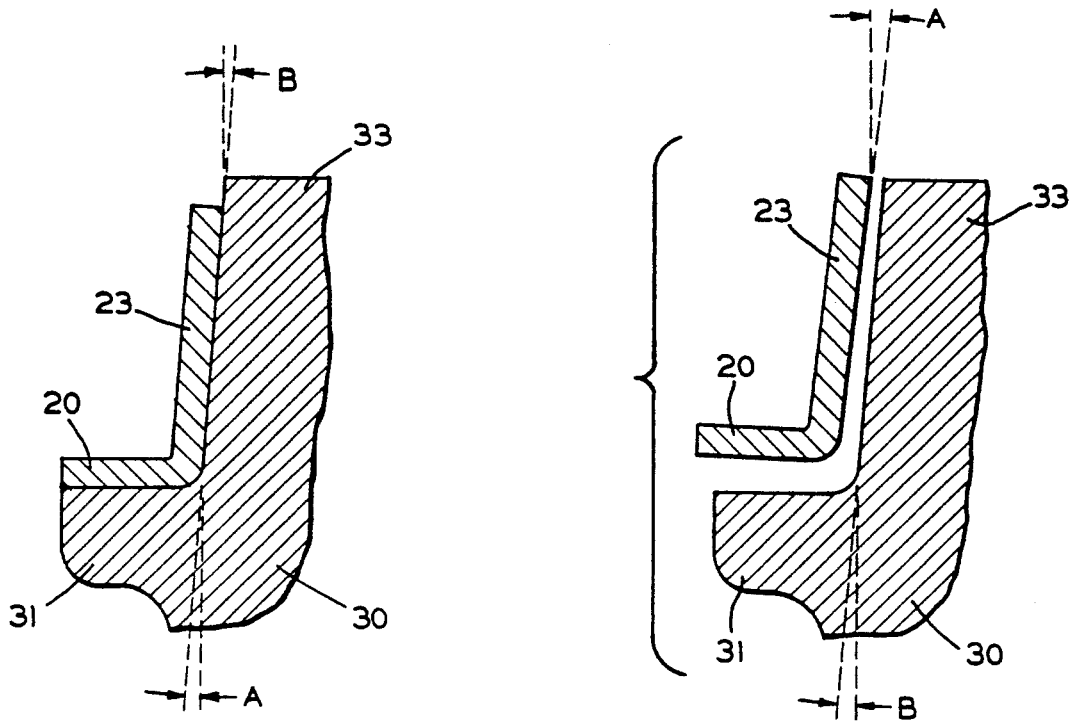
FIG. 4 is a sectional elevational view taken along line 4—4 of FIG. 3.

As best shown in FIG. 4, the tabs 23 formed on the rim plate 20 are angled inwardly toward the center of the opening 21 relative to a perpendicular line extending from the rim plate 20. The angle of inclination of the tabs 23, indicated by "A," is relatively small, typically about three degrees Similarly, the sides of the bearing support 33 are angled slightly inwardly toward the center of the opening 21. The angle of inclination of the bearing supports 33, indicated by "B," may be the same as the angle of inclination "A" of the tabs 23. If so, the bearing supports 33 will engage the tabs 23 in a slip fit when the carrier 30 is secured to the rim plate 20. Alternatively, the angle of inclination "B" of the bearing supports 33 may be slightly less than the angle of inclination "A" of the tabs 23. If so, the bearing supports 33 will engage the tabs 23 in a slight interference fit when the carrier 30 is secured to the rim plate 20.

The cooperation of the tabs 23 with the bearing supports 33 provides an important advantage when assembling the carrier 30 to the rim plate 20. In prior art axle assemblies of this type, the mounting flange of the carrier had to be carefully machined in order to precisely position the carrier relative to the rim plate and the axle housing. This machining of the carrier added time and expense to the manufacturing process. However, in the axle assembly 10 of this invention, the tabs 23 engage the bearing supports 33 when the carrier 30 is inserted through and secured to the rim plate 20. Such engagement of the tabs 23 with the bearing supports 33 functions to guide the carrier 30 into the axle housing 11, thus facilitating the assembly process. Such engagement also provides for precise positioning of the carrier 30 without requiring machining of the carrier 30 flange face and pilot.

A second important advantage of this invention is realized during operation of the axle assembly 10. As discussed above, torque loads created within the differential are exerted upon the bearing supports 33. If these torque loads become sufficiently large, they could cause undesirable deflection of the bearing supports 36. However, as discussed above, the tabs 23 formed on the rim plate 20 are engaged with the bearing supports 33. As a result, the bearing supports 33 are themselves supported by the tabs 23 within the central portion 13 of the axle housing, preventing substantial deflections thereof. The torque loads are, in large measure, transmitted through the rim plate 20 to the axle housing 11. Consequently, deflections of the bearing supports 33 are minimized, maintaining proper alignment of the differential and extending the useful life thereof.

Figure 5:
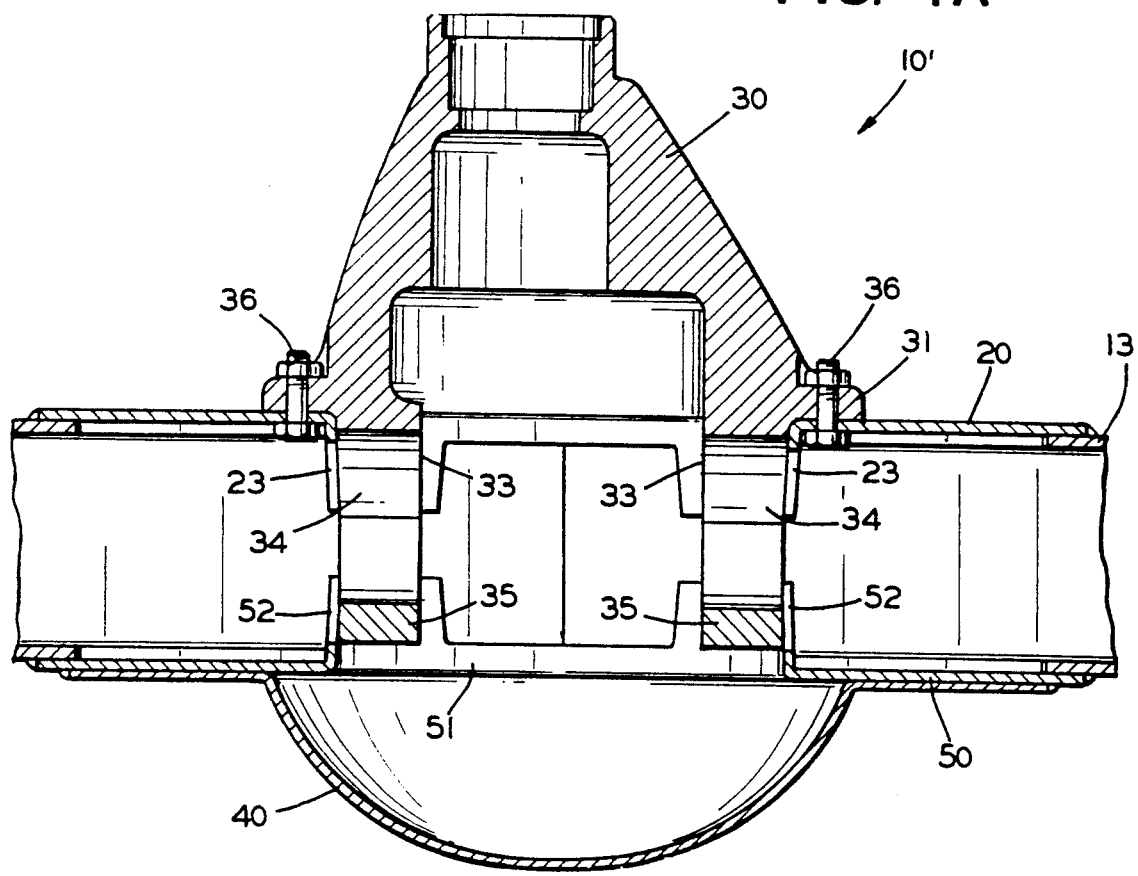
FIG. 5 is a sectional top plan view similar to FIG. 2 of a second embodiment of a portion of an axle assembly in accordance with this invention.

Referring now to FIG. 5, there is illustrated a portion of a second embodiment of an axle assembly 10' in accordance with this invention. The structure of the axle assembly 10' is similar to the structure of the axle assembly 10 described above, and like reference numbers are used to indicate identical components. In the alternate axle assembly 10', a secondary rim plate 50 is disposed between the central portion 13 of the axle housing 11 and the cover 40. The secondary rim plate 50 is attached to the forward side of the axle housing 11 by welding or other means, and the cover 40 is secured to the secondary rim plate 50 in a similar manner.

The secondary rim plate 50 is similar to the rim plate 20, having an opening 51 formed therethrough which extends generally co-extensive with the opening 14 formed through the central portion 13. Also, a plurality of secondary tabs 52 are formed about the opening 51 of the secondary rim plate 50. Four of such secondary tabs 52 are provided in the illustrated embodiment, although a greater or lesser may be provided. The tabs 52 extend rearwardly through the opening 14 into the central portion 13 of the axle housing 12 when the secondary rim plate 50 is attached thereto. When the carrier 30 is attached to the rim plate 20, the bearing caps 35 secured to the bearing supports 33 are engaged by the secondary tabs 52. This engagement of the bearing caps 35 with the secondary tabs 52 functions as described above to further minimize deflections of the bearing supports 33.

In accordance with the provisions of the patent statues, the principle and mode of operation of this invention have been explained and illustrated in its preferred embodiments. However, it must be understood that this invention may be practiced otherwise than as specifically explained and illustrated without departing from its spirit or scope.

What is claimed is:

1. An axle assembly comprising:
   an axle housing having an opening formed therethrough and a tab provided thereon, said tab extending within said axle housing at a first angle;
   a carrier including a bearing support adapted to rotatably support a differential thereon, said bearing support extending at a second angle which is different from said first angle; and
   means for securing said carrier to said axle housing such that said bearing support extends through said opening into engagement with said tab.

2. The axle assembly defined in claim 1 wherein said axle housing has a plurality of tabs provided thereon, each of said tabs extending within said axle housing at a first angle, said bearing support extending into engagement with each of said tabs.

3. The axle assembly defined in claim 1 wherein said axle housing has a plurality of tabs provided thereon and said carrier includes a plurality of bearing supports adapted to rotatably support the differential thereon, each of said tabs extending within said axle housing at said first angle, said bearing supports extending at said second angle through said opening into engagement with said tabs.

4. The axle assembly defined in claim 1 wherein said first angle is approximately three degrees relative to said axle housing.

5. The axle assembly defined in claim 1 wherein said second angle is approximately three degrees relative to said axle housing.

6. An axle assembly comprising:
   an axle housing having an opening formed therethrough;
   a rim plate attached to said axle housing, said rim plate including an opening which is disposed generally co-extensive with said axle housing opening, a tab being formed on said rim plate and extending through said axle housing opening within said axle housing;
   a carrier including a bearing support adapted to rotatably support a differential thereon; and
   means for securing said carrier to said axle housing such that said bearing support extends through said opening into engagement with said tab.

7. The axle assembly defined in claim 6 wherein said rim plate has a plurality of tabs formed thereon, each of said tabs extending through said axle housing opening within said axle housing, said bearing support extending into engagement with each of said tabs.

8. The axle assembly defined in claim 6 wherein said rim plate has a plurality of tabs formed thereon and said carrier includes a plurality of bearing supports adapted to rotatably support the differential thereon, each of said tabs extending through said axle housing opening within said axle housing, said baring supports extending through said axle housing opening into engagement with said tabs.

9. The axle assembly defined in claim 6 wherein said tab extends within said axle housing at an angle.

10. The axle assembly defined in claim 9 wherein said tab extends at an angle of approximately three degrees relative to said axle housing.

11. The axle assembly defined in claim 6 wherein said bearing support extends within said axle housing at an angle.

12. The axle assembly defined in claim 11 wherein said bearing support extends at an angle of approximately three degrees relative to said axle housing.

13. The axle assembly defined in claim 6 wherein both said tab and said bearing support extend within said axle housing at an angle.

14. The axle assembly defined in claim 13 wherein both said tab and said bearing support extend at an angle of approximately three degrees relative to said axle housing.

15. The invention defined in claim 13 wherein said said tab and said bearing support extend within said axle housing at different angles.

16. An axle assembly comprising:
   an axle housing having an opening formed therethrough and a tab provided thereon, said tab extending within said axle housing;
   a carrier including a bearing support adapted to rotatably support a differential thereon; and
   means for securing said carrier to said axle housing such that said bearing support extends through said opening into engagement with said tab to prevent movement of said carrier relative to said axle housing resulting from torque loads generated by operation of said differential.

17. The axle assembly defined in claim 16 wherein said tab and said bearing support extend at angles which are equal to one another.

18. The axle assembly defined in claim 16 wherein said tab and said bearing support extend at angles which are different from one another.

19. The axle assembly defined in claim 16 further including a rim plate attached to said axle housing, said rim plate including an opening which is disposed generally co-extensive with said axle housing opening, said tab being formed on said rim plate and extending through said axle housing opening within said axle housing.

20. The axle assembly defined in claim 16 wherein said axle housing has a plurality of tabs provided thereon and said carrier includes a plurality of bearing supports adapted to rotatably support the differential thereon, each of said tabs extending within said axle housing, said bearing supports extending through said opening into engagement with said tabs.

* * * * *